US012755952B2

(12) United States Patent
Kang et al.

(10) Patent No.: US 12,755,952 B2
(45) Date of Patent: Oct. 6, 2026

(54) MASS SPECTROMETER

(71) Applicant: YOUNG IN ACE Co., Ltd., Anyang-si (KR)

(72) Inventors: Sungwon Kang, Anyang-si (KR); Hun Lee, Anyang-si (KR); Yoon Jin Jeong, Anyang-si (KR); Ju Woo, Anyang-si (KR); Hyun-sang Lee, Anyang-si (KR); Jingeun Rhee, Anyang-si (KR)

(73) Assignee: YOUNG IN ACE Co., Ltd., Anyang-si (KR)

( * ) Notice: Subject to any disclaimer, the term of this patent is extended or adjusted under 35 U.S.C. 154(b) by 293 days.

(21) Appl. No.: 18/715,315

(22) PCT Filed: Dec. 1, 2022

(86) PCT No.: PCT/KR2022/019402
§ 371 (c)(1),
(2) Date: May 31, 2024

(87) PCT Pub. No.: WO2023/101484
PCT Pub. Date: Jun. 8, 2023

(65) Prior Publication Data

US 2025/0029824 A1 Jan. 23, 2025

(30) Foreign Application Priority Data

Dec. 2, 2021 (KR) ........................ 10-2021-0171067

(51) Int. Cl.
*H01J 49/06* (2006.01)
*H01J 49/04* (2006.01)

(52) U.S. Cl.
CPC .......... *H01J 49/045* (2013.01); *H01J 49/067* (2013.01)

(58) Field of Classification Search
CPC ........ H01J 49/06; H01J 49/045; H01J 49/067; H01J 49/145; H01J 49/168; H01J 49/0404; H01J 49/0422; H01J 49/0477
See application file for complete search history.

(56) References Cited

U.S. PATENT DOCUMENTS 5,349,186 A * 9/1994 Ikonomou ............. H01J 49/167 250/288
5,432,343 A 7/1995 Gulcicek et al.
(Continued)

FOREIGN PATENT DOCUMENTS

CN 107219214 A 9/2017
JP H 02132747 A 5/1990
(Continued)

OTHER PUBLICATIONS

International Search Report of the International Searching Authority, mailed on Mar. 6, 2023, from International Application No. PCT/KR2022/019402, filed on Dec. 1, 2022. 6 pages.
(Continued)

*Primary Examiner* — Tung X Le
(74) *Attorney, Agent, or Firm* — HoustonHogle LLP

(57) ABSTRACT

The present invention provides a mass spectrometer including a sample introduction part, an ionization part connected to the sample introduction part and configured to ionize the sample introduced from the sample introduction part, an ion lens part including an extraction lens adjacent to the ionization part and a guiding lens configured to guide ion beam extracted from the extraction lens, an interface part between the ionization part and the ion lens part, and a detection part configured to detect the ion beam, wherein the extraction lens includes a first extraction lens adjacent to the interface part and a second extraction lens between the first extraction lens and the guiding lens, each of the first and second extraction lenses has a hollow cone shape, the first extraction
(Continued)

lens includes a protrusion protruding from an outer sidewall thereof to the interface part, and an internal space of the second extraction lens includes a first space having a pillar shape and a second space having a cone shape and extending from the first space.

15 Claims, 4 Drawing Sheets

(56) References Cited

U.S. PATENT DOCUMENTS

| | | | | |
|---|---|---|---|---|
| 5,485,016 | A * | 1/1996 | Irie | H01J 49/0422 250/281 |
| 9,048,079 | B2 * | 6/2015 | Krutchinsky | H01J 49/062 |
| 9,305,758 | B2 | 4/2016 | Kalinitchenko | |
| 9,697,999 | B2 * | 7/2017 | Makarov | H01J 49/26 |
| 10,290,482 | B1 | 5/2019 | Yamada et al. | |
| 10,854,438 | B2 | 12/2020 | Yamada et al. | |
| 11,075,066 | B2 | 7/2021 | Itagaki et al. | |
| 2009/0039251 | A1 | 2/2009 | Yamada et al. | |
| 2009/0039282 | A1 * | 2/2009 | Haase | H01J 49/164 250/282 |
| 2009/0266984 | A1 | 10/2009 | Hirano | |
| 2010/0059675 | A1 * | 3/2010 | Mukaibatake | H01J 49/065 250/288 |
| 2014/0103206 | A1 | 4/2014 | Mukaibatake et al. | |
| 2018/0315589 | A1 * | 11/2018 | Oshiro | H01J 49/401 |
| 2019/0326108 | A1 * | 10/2019 | Brown | H01J 49/0404 |
| 2020/0135443 | A1 * | 4/2020 | Itagaki | H01J 49/0036 |
| 2021/0193448 | A1 * | 6/2021 | Matsuda | H01J 49/06 |

FOREIGN PATENT DOCUMENTS

| | | | |
|---|---|---|---|
| JP | H 06187943 | A | 7/1994 |
| JP | H 10040857 | A | 2/1998 |
| JP | H 10142155 | A | 5/1998 |
| JP | H 10144252 | A | 5/1998 |
| JP | 2001185073 | A | 7/2001 |
| JP | 2001202917 | A | 7/2001 |
| JP | 2004071470 | A | 3/2004 |
| JP | 2005251546 | A | 9/2005 |
| JP | 2009043608 | A | 2/2009 |
| JP | 2015511704 | A | 4/2015 |
| JP | 2015127683 | A | 7/2015 |
| JP | 2019160785 | A | 9/2019 |
| JP | 2019164135 | A | 9/2019 |
| JP | 2020068202 | A | 4/2020 |
| KR | 100748617 | B1 | 8/2007 |
| KR | 101819534 | B1 | 3/2018 |
| KR | 20220075828 | A | 6/2022 |

OTHER PUBLICATIONS

Written Opinion of the International Searching Authority, mailed on Mar. 6, 2023, from International Application No. PCT/KR2022/019402, filed on Dec. 1, 2022. 4 pages.

* cited by examiner

MASS SPECTROMETER

RELATED APPLICATIONS

This application is a § 371 National Phase Application of International Application No. PCT/KR2022/019402, filed on Dec. 1, 2022, now International Publication No. WO 2023/101484 A1, published on Jun. 8, 2023, which International Application claims priority to Korean Application No. 10-2021-0171067, filed on Dec. 2, 2021, both of which are incorporated herein by reference in their entirety.

TECHNICAL FIELD

The present invention relates to a mass spectrometer, and more particularly, to a mass spectrometer including an ion lens used at environmental sites.

BACKGROUND ART

In order to check a process status at a semiconductor manufacturing site, there is a need for a method to measure and analyze a concentration and distribution of various ions or elements. In addition, as air and water pollution are accelerated, there is a need for methods to measure and analyze the level of pollution at environmental sites. A mass spectrometer may be used for the measurement and analysis.

A mass spectrometer is an instrument that identifies or analyzes chemical agents, etc. through mass analysis. The mass spectrometer may analyze components of a sample by measuring a mass of a substance at a mass-to-charge ratio. The samples may be ionized within the mass spectrometer using a variety of methods. The ionized sample may be accelerated while passing through electric and/or magnetic fields. That is, a path of a portion or whole of the ionized sample may be bent by the electric fields and/or magnetic fields. A detector may detect the ionized sample.

DISCLOSURE OF THE INVENTION

Technical Problem

One technical object of the present invention is to provide a mass spectrometer having high transmission efficiency of ions to be analyzed and improved resolution and measurement accuracy.

Technical objects to be solved by the present invention are not limited to the aforementioned technical objects and unmentioned technical objects will be clearly understood by those skilled in the art from the specification and the appended claims.

Technical Solution

In order to solve the above-mentioned technical problems, the mass spectrometer according to an embodiment of the present invention may include a sample introduction part, an ionization part connected to the sample introduction part and configured to ionize the sample introduced from the sample introduction part, an ion lens part including an extraction lens adjacent to the ionization part and a guiding lens configured to guide ion beam extracted from the extraction lens, an interface part between the ionization part and the ion lens part, and a detection part configured to detect ion beam, wherein the extraction lens includes a first extraction lens adjacent to the interface part and a second extraction lens between the first extraction lens and the guiding lens, each of the first and second extraction lenses has a hollow cone shape, the first extraction lens includes a protrusion protruding from an outer sidewall thereof to the interface part, and an internal space of the second extraction lens includes a first space having a pillar shape and a second space having a cone shape and extending from the first space.

The first extraction lens may be configured so that a voltage of 0 V is applied thereto.

The interface part may include a skimmer cone, and the skimmer cone may include a first portion having a hollow cone shape and a second portion connected to the first portion and having a hollow pillar shape.

A rear surface of the first portion of the skimmer cone may coincide with a front surface of the first extraction lens.

A rear surface of the first portion of the skimmer cone may be spaced apart from a front surface of the first extraction lens, and a spaced distance between the rear surface of the first portion of the skimmer cone and the front surface of the first extraction lens may be 0.5 mm or less.

The first extraction lens may be in physical contact with the first portion of the skimmer cone.

An inner sidewall of the skimmer cone may include at least one or more stepped portions on the inner sidewall of the skimmer cone.

An internal space of the skimmer cone may include a first space, a second space, and a third space in the first portion and a fourth space in the second portion, wherein the first space may be a cone-shaped space, each of the second to fourth spaces may be a pillar-shaped space, a width of a rear surface of the first space may be substantially the same as a width of the second space, the width of the second space may be less than a width of the third space, and the width of the third space may be less than a width of the fourth space.

At least a portion of the first extraction lens may be provided in the fourth space.

At least a portion of the first extraction lens may be provided in the third space.

At least a portion of the second extraction lens may overlap the first extraction lens, and a front surface of the second extraction lens may be disposed between a front surface of the first extraction lens and a rear surface of the first extraction lens.

A spaced distance between the front surface of the second extraction lens and the front surface of the first extraction lens may be 4 mm to 10 mm.

The rear surface of the first extraction lens may be disposed inside the interface part.

The sample introduction part may include: a nebulizer configured to change a liquid sample into an aerosol state; and a spray chamber connected to the nebulizer and configured to control a flow of aerosols so that only relatively small-sized aerosols move to the ionization part through a temperature control.

The ionization part may include: a first tube connected to the spray chamber of the sample introduction part and disposed at the innermost side; a third tube having an end facing the ion lens part and disposed at the outermost side; a second tube disposed between the first tube and the third tube; and an induction coil having a spiral shape that surrounds the outside of the third tube.

Advantageous Effects

The ion lens part of the mass spectrometer according to the present invention may prevent and/or minimize the loss of the ions to be analyzed. Therefore, the transmittance efficiency of the ions to be analyzed may be improved, and as a result, the resolution and measurement accuracy of the mass spectrometer according to the present invention may be improved.

BEST MODE FOR CARRYING OUT THE INVENTION

Figure 2:
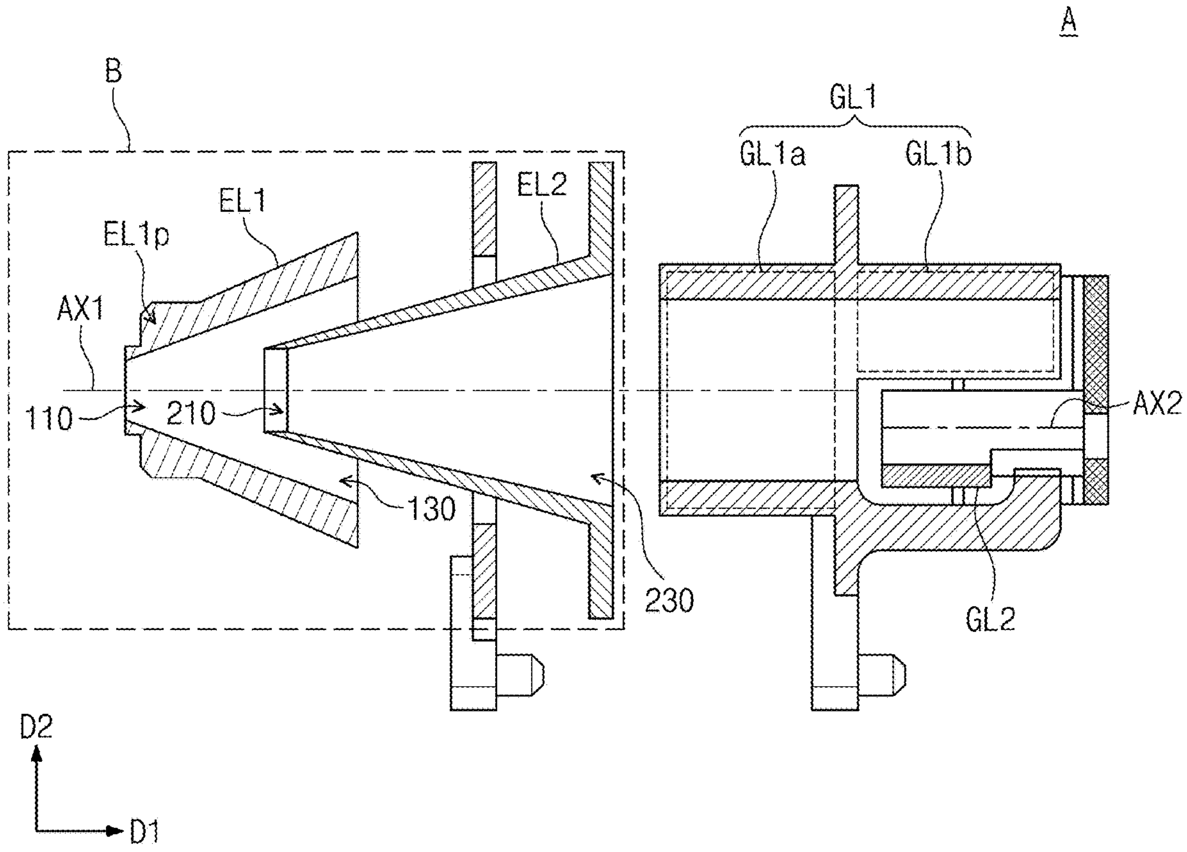
FIG. 2 is an enlarged view for explaining the ion lens part of the mass spectrometer, which corresponds to a portion A of FIG. 1, according to embodiments of the present invention.

The best mode for carrying out the present invention is illustrated in FIG. 2.

MODE FOR CARRYING OUT THE INVENTION

Embodiments of the present invention will be described with reference to the accompanying drawings so as to sufficiently understand constitutions and effects of the present invention.

The present invention is not limited to the embodiments disclosed below, but should be implemented in various forms, and various modifications and changes may be made. Rather, these embodiments are provided so that this disclosure will be thorough and complete, and will fully convey the scope of the present invention to those skilled in the art. Further, the present invention is only defined by the scope of the claims. In the accompanying drawings, the components are shown enlarged for the sake of convenience of explanation, and the proportions of the components may be exaggerated or reduced for clarity of illustration.

In the following description, the technical terms are used only for explaining a specific exemplary embodiment while not limiting the present invention. Unless terms used in embodiments of the present invention are differently defined, the terms may be construed as meanings that are commonly known to a person skilled in the art.

In this specification, the terms of a singular form may comprise plural forms unless specifically mentioned. The meaning of 'comprises' and/or 'comprising' specifies a component, a step, an operation and/or an element does not exclude other components, steps, operations and/or elements.

When a layer is referred to herein as being 'on' another layer, it may be formed directly on the top of the other layer or a third layer may be interposed between them.

It will be understood that although the terms first and second are used herein to describe various regions, layers, and the like, these regions and layers should not be limited by these terms. These terms are used only to discriminate one region or layer from another region or layer. Therefore, a portion referred to as a first portion in one embodiment can be referred to as a second portion in another embodiment. An embodiment described and exemplified herein includes a complementary embodiment thereof. Like reference numerals refer to like elements throughout.

Hereinafter, embodiments of a mass spectrometer according to the present invention will be described in detail with reference to the drawings.

Figure 1:
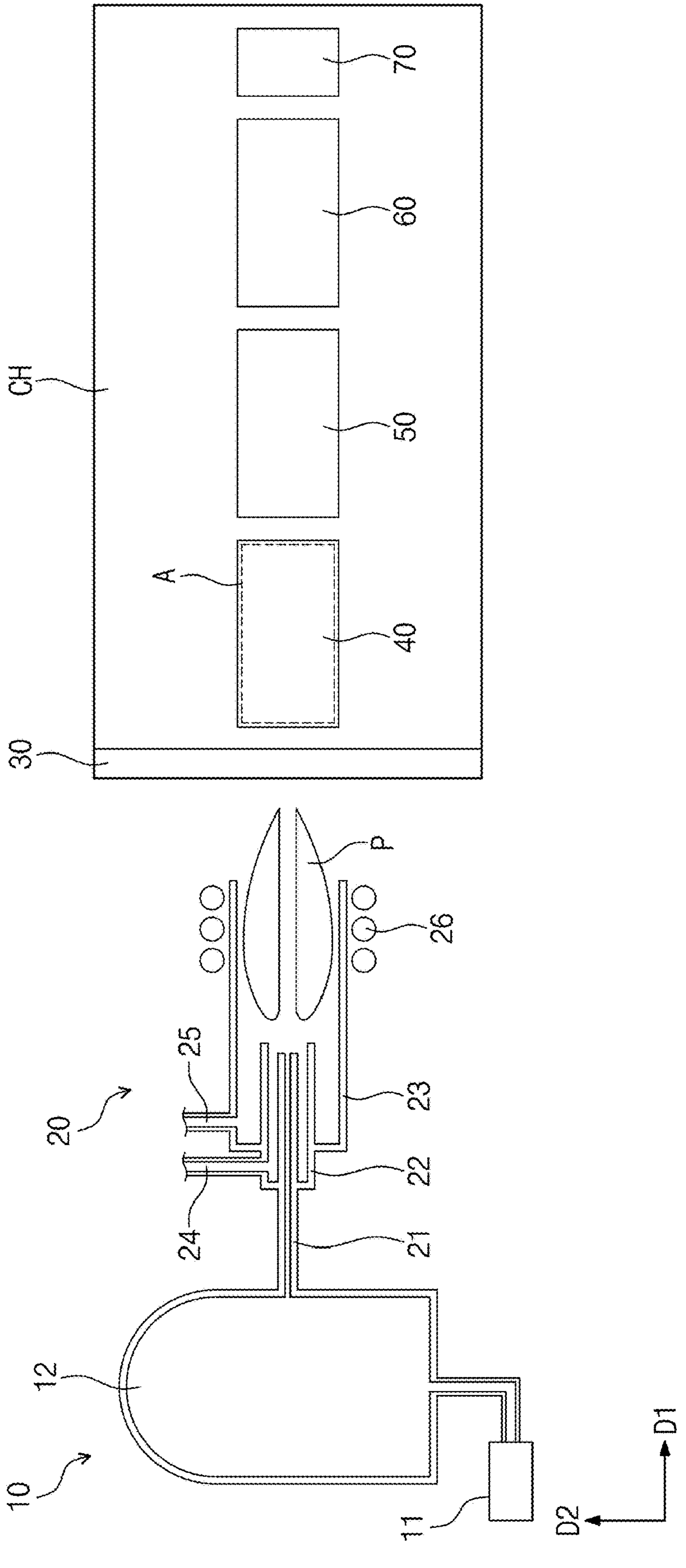
FIG. 1 is a conceptual view for explaining a mass spectrometer according to embodiments of the present invention.

FIG. 1 is a conceptual view for explaining a mass spectrometer according to embodiments of the present invention.

Referring to FIG. 1, a mass spectrometer according to the present invention may include a sample introduction part 10, an ionization part 20, an interface part 30, an ion lens part 40, a reaction part 50, a mass separation part 60, and a detection part 70. The mass spectrometer according to the present invention is shown and described as a mass spectrometer using inductively coupled plasma (ICP), but this is only illustrative, and the present invention is not limited thereto, and thus, the mass spectrometer according to the present invention may be a variety of mass spectrometers including the ion lens part 40, which is shown and described below.

The sample introduction part 10 may include a nebulizer 11 and a spray chamber 12. The nebulizer 11 may change a liquid sample into an aerosol state to inject the aerosol sample into the spray chamber 12. The spray chamber 12 may be connected to the nebulizer 11. The spray chamber 12 may reduce sample fluctuations and constantly maintain a size and amount of the sample moving to the ionization part 20, which will be described later. Particularly, the spray chamber 12 may remove relatively large aerosols through temperature control and may control a flow of aerosols so that only relatively small aerosols move to the ionization part 20. According to embodiments, a carrier gas may be supplied to the nebulizer 11 and/or the spray chamber 12 through at least one gas supply pipe. The carrier gas may allow the sample to be introduced into plasma P.

The ionization part 20 may be connected to the sample introduction part 10. The ionization part 20 may be referred to as, for example, a plasma torch. The ionization part 20 may include a first tube 21, a second tube 22, a third tube 23, and an induction coil 26.

The first tube 21 may be connected to the spray chamber 12 of the sample introduction part 10 and may be disposed at the innermost side of the ionization part 20. The third tube 23 may be disposed at the outermost side of the ionization part 20, and the second tube 22 may be disposed between the first tube 21 and the third tube 23. The second tube 22 and the third tube 23 may be connected to a first gas supply pipe 24 and a second gas supply pipe 25, respectively. Each of the first to third tubes 201, 202, and 203 may have a hollow pillar shape extending in a first direction D1. Each of the first to third tubes 201, 202, and 203 may have a concentric circular shape in which central axes coincide with each other in terms of a cross-sectional area cut along a plane perpendicular to the first direction D1. Each of the first to third tubes 201, 202, and 203 may be made of, for example, quartz, alumina, platinum, or sapphire.

The sample and carrier gas may move through the first tube 21, an auxiliary gas may move through the first gas supply pipe 24 and the second tube 22, and the second gas supply pipe 25 and the third tube 23 may allow a cooling gas to move. The auxiliary gas may prevent or minimize ends of the first and second tubes 201 and 202 from being damaged due to contact with the plasma P. The cooling gas may prevent or minimize an inner wall of the third tube 23 from being damaged due to contact with the plasma P. Each of the carrier gas, the auxiliary gas, and the cooling gas may include, for example, argon (Ar).

For example, the induction coil 26 may have a spiral shape that surrounds the outside of the third tube 23 at least twice. The induction coil 26 may generate strong electromagnetic fields that are changed temporally inside the ionization part 20. The electromagnetic fields generated by the induction coil 26 may generate the plasma P by discharging the gas therein.

The high temperature plasma P may ionize the aerosol sample introduced from the sample introduction part 10.

According to embodiments, the ionization part 20 may further include a high-power RF power source connected to the induction coil 26 and a shielding plate between the induction coil 26 and an outer wall of the third tube 23.

The interface part 30 may extract an ionized sample from the plasma P generated in the ionization part 20 in the form of ion beam. The interface part 30 may be adjacent to the ionization part 20 in the first direction D1. The interface part 30 may be connected to the chamber CH. The interface part 30 may be provided between the ionization part 20 and the chamber CH. The interface part 30 may include a sampler cone and a skimmer cone that extract the ion beam. For example, each of the sampler cone and the skimmer cone may have a hollow cone shape of which a width in the second direction D2 increases as it moves toward the first direction D1.

The ion lens part 40, the reaction part 50, the mass separation part 60, and the detection part 70 may be provided inside the chamber CH. The inside of the chamber CH may be maintained in a vacuum state. At least one of the ion lens part 40, the reaction part 50, the mass separation part 60, or the detection part 70 may be provided, for example, in sub-chambers within the chamber CH, and the sub-chambers may be maintained in a vacuum state different from the inside of the chamber CH. The ion lens part 40, the reaction part 50, the mass separation part 60, and the detection part 70 may be arranged, for example, along the first direction D1, but the present invention is not limited thereto.

The ion lens part 40 may be provided between the interface part 30 and the reaction part 50. According to embodiments, at least a portion of the ion lens part 40 may be connected to and/or overlap the interface part 30. The ion lens part 40 may include at least one lens and may block photons, neutral particles, etc. through one or more lenses and control a path of ions that are targets to be analyzed (hereinafter, referred to as ions to be analyzed). Hereinafter, a detailed configuration of the ion lens part 40 will be described in detail with reference to FIGS. 2 and 3.

The reaction part 50 may be provided between the ion lens part 40 and the mass separation part 60. The reaction part 50 may be referred to as a collision/reaction cell. According to embodiments, the collision/reaction gas may be supplied to the reaction part 50 through at least one gas supply pipe. The collision/reaction gas may collide with various ions inside the reaction part 50 and convert interfering ions (e.g., 40Ar, 40Ar16O, 38ArH, etc.) into non-interfering species or convert ions to be analyzed to ions having a different mass.

The mass separation part 60 may be provided between the reaction part 50 and the detection part 70. The mass separation part 60 may use, for example, a quadrupole method, a double focusing magnetic sector method, or a time-of-flight method and may separates ions according to a mass-to-charge ratio (m/z). Unlike that shown, another mass separation part 60 may be additionally provided between the ion lens part 40 and the reaction part 50.

The detection part 70 may be adjacent to an end of the mass separation part 60 and may detect a mass spectrum of the ions to be analyzed that are separated in the mass separation part 60. The detection part 70 may use, for example, a channel electron multiplier, a Faraday cup, or a discrete dynode electron multiplier.

FIG. 2 is an enlarged view for explaining the ion lens part of the mass spectrometer, which corresponds to a portion A of FIG. 1, according to embodiments of the present invention.

Referring to FIGS. 1 and 2, the ion lens part 40 of the mass spectrometer according to the present invention may include a first extraction lens EL1, a second extraction lens EL2, a first guiding lens GL1, and a second guiding lens GL2. The first extraction lens EL1, the second extraction lens EL2, the first guiding lens GL1, and the second guiding lens GL2 may be arranged along the first direction D1. Here, the number of extraction lenses EL1 and EL2 and the number of guiding lenses GL1 and GL2 are merely examples, and the present invention is not limited thereto.

The first and second extraction lenses EL1 and EL2 may be disposed adjacent to the interface part 30. The first extraction lens EL1 may be provided between the interface part 30 and the second extraction lens EL2, and the second extraction lens EL2 may be provided between the first extraction lens EL1 and the first guiding lens GL1. For example, each of the first and second extraction lenses EL1 and EL2 may have a hollow cone shape of which a width in the second direction D2 increases as it moves toward the first direction D1. A central axis of each of the first and second extraction lenses EL1 and EL2 may coincide with a first axis AX1 extending in the first direction D1. A central axis of the first extraction lens EL1 may coincide with a central axis of the second extraction lens EL2. Each of the first and second extraction lenses EL1 and EL2 may have a symmetrical shape about the first axis AX1. Each of the first and second extraction lenses EL1 and EL2 may have openings in front and rear surfaces thereof In this specification, the front surface may refer to a surface facing the ionization part 20 and the interface part 30 (i.e., a direction opposite to the first direction D1), and the rear surface may refer to a surface facing the reaction part 50 (i.e., the first direction D1). The front and rear surfaces may be surfaces perpendicular to the first direction D1 and parallel to the second direction D2.

The first extraction lens EL1 may have a first front opening 110 facing the interface part 30 and a first rear opening 130 facing the first guiding lens GL1. A diameter of the first front opening 110 may be less than that of the first rear opening 130.

The first extraction lens EL1 may include a protrusion EL1*p* protruding from an outer sidewall toward the interface part 30. The protrusion EL1*p* of the first extraction lens EL1 may have a strip shape surrounding the outer sidewall or may be provided in plurality at a plurality of positions on the outer sidewall.

The second extraction lens EL2 may include a second front opening 210 facing the first front opening 110 of the first extraction lens EL1 and a second rear opening 230 facing the first guiding lens GL1. A diameter of the second front opening 210 may be less than that of the second rear opening 230. The diameter of the second front opening 210 may be less than that of the first rear opening 130.

At least a portion of the second extraction lens EL2 may overlap the first extraction lens EL1 in the second direction D2. In other words, at least a portion of the second extraction lens EL2 may be disposed inside the first extraction lens EL1.

First voltage apply parts may be connected to the first and second extraction lenses EL1 and EL2, respectively. According to embodiments, the first voltage apply parts may be adjacent to the first rear opening 130 of the first extraction lens EL1 and the second rear opening 230 of the second extraction lens EL2, respectively. The first and second extraction lenses EL1 and EL2 may extract ion beam passing through the ionization part 20 and the interface part 30 by voltages applied to the first voltage apply parts, respectively.

A voltage of 0 V, which is the same as that of the skimmer cone SC (see FIG. 3) that will be described later, may be applied to the first extraction lens EL1. As the voltage of 0 V is applied to the first extraction lens EL1, the ions to be analyzed may be extracted from the skimmer cone SC (see FIG. 3) to an internal space of the first extraction lens EL1 by a difference in degree of vacuum without an influence of the electric fields. When measuring and analyzing a level of pollution at environmental sites, there may be more matrix components (i.e., ions that are not the ions to be analyzed but have a mass similar to that of the ions to be analyzed) than in other environments, and it may be important to reduce a loss of the ions to be analyzed while removing the matrix components (because the space charge effect allows the matrix components and the ions to be analyzed to spread out rather than being concentrated along the first axis AX1). As a result, the loss of the ions to be analyzed may be prevented and/or minimized by applying the voltage of 0 V to the first extraction lens EL1 and by technical features described later. Therefore, the transmittance efficiency of the ions to be analyzed may be improved, and as a result, the resolution and measurement accuracy of the mass spectrometer according to the present invention may be improved.

The first and second guiding lenses GL1 and GL2 may be disposed adjacent to the reaction part 50. The first guiding lens GL1 may be provided between the second extraction lens EL2 and the second guiding lens GL2, and the second guiding lens GL2 may be provided between the first guiding lens GL1 and the reaction part 50. According to embodiments, the first guiding lens GL1 may be spaced apart from the second extraction lens EL2 in the first direction D1. Each of the first and second guiding lenses GL1 and GL2 may have openings in front and rear surfaces thereof. In the second guiding lens GL2, a diameter of the rear opening may be less than that of the front opening.

A central axis of the first guiding lens GL1 may coincide with the first axis AX1. More specifically, the central axis of the first guiding lens GL1 may be defined as a central axis of a first portion GL1*a* of the first guiding lens GL1, which will be described later. The central axis of the first guiding lens GL1 may coincide with the central axis of each of the first and second extraction lenses EL1 and EL2. A central axis of the second guiding lens GL2 may be parallel to the first axis AX1 and may coincide with a second axis AX2 spaced apart from the first axis AX1 in the second direction D2. The central axis of the second guiding lens GL2 may be different from the central axes of each of the first and second extraction lenses EL1 and EL2 and the first guiding lens GL1. However, this is only an example, and the present invention is not limited thereto, and the central axis of the second guiding lens GL2 may coincide with the central axis of each of the first and second extraction lenses EL1 and EL2 and the first guiding lens GL1. The rear opening of the second guiding lens GL2 may be disposed at a position through which the second axis AX2 passes.

For example, the first guiding lens GL1 may include a first portion GL1*a* provided between the second extraction lens EL2 and the second guiding lens GL2 and a second portion GL1*b* integrally connected to the first portion GL1*b* and overlapping the second guiding lens in the second direction D2. The second portion GL1*b* may be connected to a rear surface of the first portion GL1*a* so as to be integrated with each other. The first portion GL1*a* may be spaced apart from the second guiding lens GL2 in the first direction D1. The second portion GL1*b* may be spaced apart from the second guiding lens GL2 in the second direction D2.

The first portion GL1*a* may have a hollow pillar shape (e.g., a hollow cylinder shape). The second portion GL1*b* may have a shape similar to a hollow pillar cut along a plane including a central axis thereof. A lower portion of the second portion GL1*b* may be open toward the second guiding lens GL2, and an upper portion of the second portion GL1*b* may be blocked from the outside. In this specification, the lower portion may refer to a portion facing an opposite direction of the second direction D2, and the upper portion may refer to a portion facing the second direction D2.

Similar to the second portion GL1*b* of the first guiding lens GL1, the second guiding lens GL2 may have a shape such as a hollow pillar cut along a plane including a central axis thereof. However, unlike the second portion GL1*b* of the first guiding lens GL1, the upper portion of the second guiding lens GL2 may be opened toward the second portion GL1*b* of the first guiding lens GL1, and the lower portion of the second guiding lens GL2 may be blocked from the outside. According to embodiments, the second guiding lens GL2 may be physically connected to the first portion GL1*a* of the first guiding lens GL1.

Second voltage apply parts may be connected to the first and second guiding lenses GL1 and GL2, respectively. The first and second guiding lenses GL1 and GL2 may control a path of the ion beam passing through the first and second extraction lenses EL1 and EL2 by voltages applied to the second voltage apply parts, respectively. The voltage of each of the second voltage apply parts may be adjusted to determine an optimal path for each energy of the ions.

Particularly, in the ion beams passing through the first and second extraction lenses EL1 and EL2, the ions having electric charges may have a path bent by the voltage applied to each of the second voltage apply parts and be directed to the reaction part 50 through the rear opening of the second guiding lens GL2, and photons, neutral particles, etc., which travel in a straight line, may proceed in the first direction D1 along the first axis AX1 and be blocked without passing through the rear opening of the second guiding lens GL2. The first and second guiding lenses GL1 and GL2 of the mass spectrometer according to the present invention may block the photons, the neutral particles, the metastable ions, etc. and control the path of the ions to be analyzed. Thus, measurement accuracy of the mass spectrometer according to the present invention may be improved.

Figure 3:
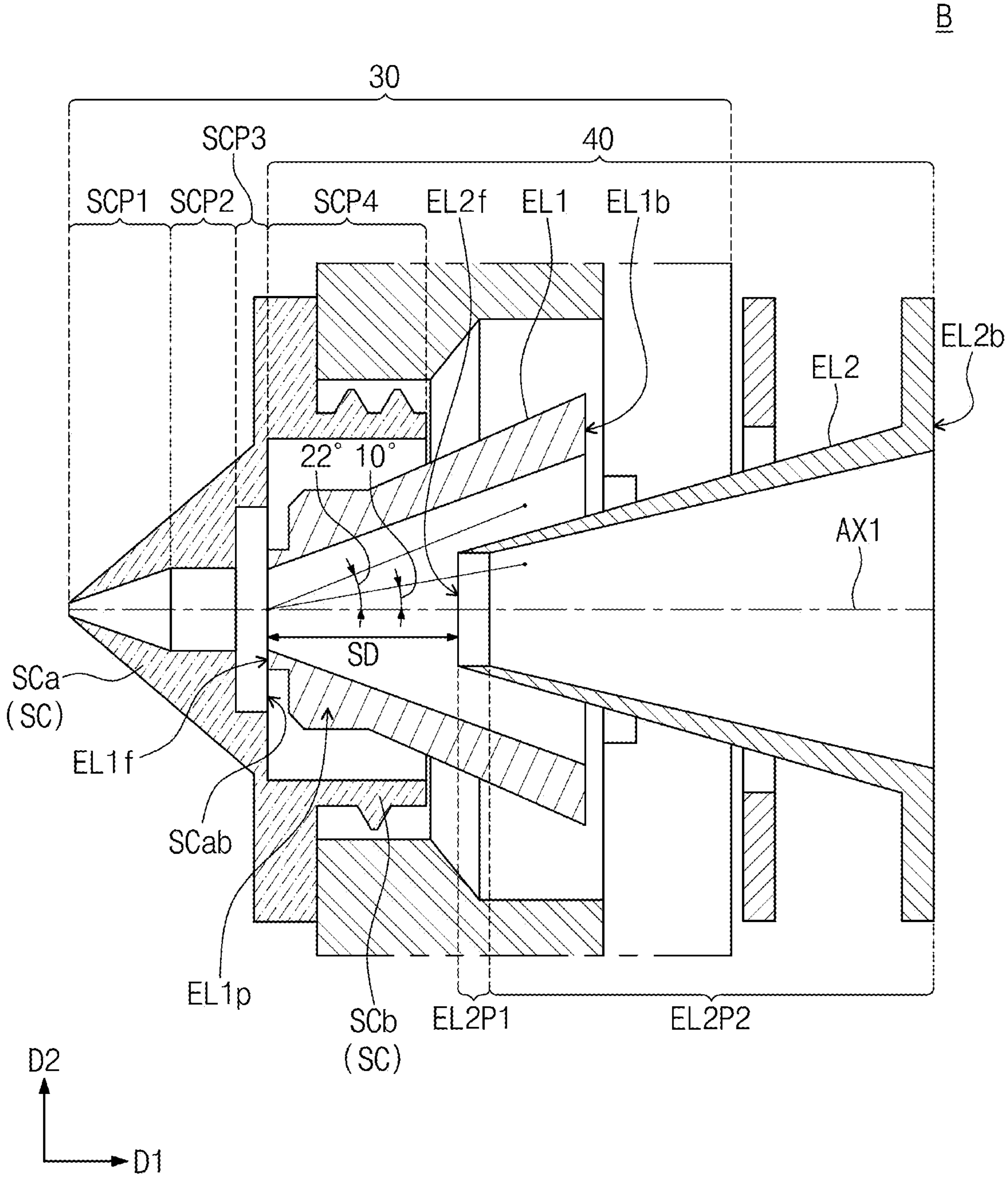
FIG. 3 is an enlarged view for explaining the ion lens part of the mass spectrometer, which corresponds to a portion B of FIG. 2, in more detail according to embodiments of the present invention.

FIG. 3 is an enlarged view for explaining the ion lens part of the mass spectrometer, which corresponds to a portion B of FIG. 2, in more detail according to embodiments of the present invention.

Referring to FIG. 3, at least a portion of the ion lens part 40 may overlap the interface part 30 in the second direction D2. In other words, at least a portion of the ion lens part 40 may be disposed inside the interface part 30.

The interface part 30 may include a skimmer cone SC. The skimmer cone SC may include a first portion SCa having a hollow cone shape, of which a width in the second direction D2 increases as it moves toward the first direction D1, and a second portion SCb connected to the first portion SCa and having a hollow pillar shape with a constant width in the second direction D2 while moving in the first direction D1. The second portion SCb may surround at least a portion of the first extraction lens EL1.

For example, a rear surface Scab of the first portion SCa may be disposed at substantially the same position as a front surface EL1*f* of the first extraction lens EL1. According to an embodiment, a portion of the first extraction lens EL1 may overlap the first portion SCa in the second direction D2, and the front surface EL1*f* of the first extraction lens EL1 may be spaced apart from the rear surface SCab of the first portion SCa in the first direction D1. Here, the first extraction lens EL1 may be in physical contact with the first portion SCa. According to another embodiment, the first extraction lens EL1 may not overlap the first portion SCa in the second direction D2, and the rear surface SCab of the first portion SCa may be spaced apart from the front surface EL1*f* of the first extraction lens EL1 in the first direction D1. When the rear surface (SCab) of the first portion SCa and the front surface (EL1*f*) of the first extraction lens EL1 are spaced apart from each other, a spaced distance may be, for example, less than about 0.5 mm.

An internal space of the skimmer cone SC may include a first space SCP1, a second space SCP2, and a third space SCP3 in the first portion SCa, and a fourth space SCP4 in the second portion SCb. For example, the first space SCP1 of the skimmer cone SC may be a cone-shaped space of which a width in the second direction D2 increases as it moves toward the first direction D1. For example, each of the second space SCP2, the third space SCP3, and the fourth space SCP4 of the skimmer cone SC may be a pillar-shaped space with a constant width in the second direction D2 while moving in the first direction D1. A width of the rear surface of the first space SCP1 of the skimmer cone SC in the second direction D2 may be substantially the same as that of the second space SCP2 of the skimmer cone SC in the second direction D2. A width of the second space SCP2 of the skimmer cone SC in the second direction D2 may be less than that of the third space SCP3 of the skimmer cone SC in the second direction D2. A width of the third space SCP3 of the skimmer cone SC in the second direction D2 may be less than that of the fourth space SCP4 of the skimmer cone SC in the second direction D2. In other words, the inner sidewall of the skimmer cone SC may have a stair structure including at least one or more stepped portions.

At least a portion of the first extraction lens EL1 may be provided in the fourth space SCP4 of the skimmer cone SC. The front surface EL1*f* of the first extraction lens EL1 may be disposed at substantially the same position as the rear surface SCab of the third space SCP3 of the skimmer cone SC (i.e., the rear surface SCab of the first portion SCa of the skimmer cone SC). According to embodiments, at least a portion of the first extraction lens EL1 may be provided in the third space SCP3 of the skimmer cone SC.

The first extraction lens EL1 including the protrusion EL1*p* may be disposed adjacent to the stair structure of the inner sidewall of the skimmer cone SC. According to embodiments, the protrusion EL1*p* of the first extraction lens EL1 may be disposed to be fit into the stair structure of the inner sidewall of the skimmer cone SC. Since the first extraction lens EL1 is disposed as close as possible to the inner sidewall of the skimmer cone SC (or the protrusion EL1*p* of the first extraction lens EL1 is fitted into the stair structure on the inner sidewall of the skimmer cone SC), it may be possible to prevent and/or minimize the ions to be analyzed from escaping along the outer sidewall of the first extraction lens EL1. Therefore, the transmittance efficiency of the ions to be analyzed may be improved, and as a result, the resolution and measurement accuracy of the mass spectrometer according to the present invention may be improved.

The front surface EL2*f* of the second extraction lens EL2 may be disposed between the front surface EL1*f* of the first extraction lens EL1 and the rear surface EL1*b* of the first extraction lens EL1. A spaced distance between the front surface EL2*f* of the second extraction lens EL2 and the front surface EL1*f* of the first extraction lens EL1 may be, for example, about 4 mm to about 15 mm. When compared to a comparative example described later, the front surface EL2*f* of the second extraction lens EL2 may be disposed closer to the front surface EL1*f* of the first extraction lens EL1, and the ions to be analyzed may be prevented and/or minimized from escaping along the outer sidewall of the second extraction lens EL2. Therefore, the transmittance efficiency of the ions to be analyzed may be improved, and as a result, the resolution and measurement accuracy of the mass spectrometer according to the present invention may be improved.

The rear surface EL1*b* of the first extraction lens EL1 may be disposed between the front surface EL2*f* of the second extraction lens EL2 and the rear surface EL2*b* of the second extraction lens EL2. The rear surface EL1*b* of the first extraction lens EL1 may be disposed inside the interface part 30. The rear surface EL2*b* of the second extraction lens EL2 may be spaced apart from the rear surface EL1*b* of the first extraction lens EL1 in the first direction D1.

An internal space of the second extraction lens EL2 may include a first space EL2P1 defined within the first extraction lens EL1 and having a pillar shape and a second space EL2P2 having a cone shape extending from the first space EL2P1. The first space EL2P1 of the second extraction lens EL2 may extend from the front surface EL2*f*. The second space EL2P2 of the second extraction lens EL2 may extend from the first space EL2P1 to the rear surface EL2*b*. The first space EL2P1 of the second extraction lens EL2 may help the analysis target ions incident onto the second extraction lens EL2 to be concentrated close to the first axis AX1, and thus, a loss of the ions to be analyzed at the rear end of the second extraction lens EL2 may be prevented and/or minimized. Therefore, the transmittance efficiency of the ions to be analyzed may be improved, and as a result, the resolution and measurement accuracy of the mass spectrometer according to the present invention may be improved.

The first and second extraction lenses EL1 and EL2 of the mass spectrometer according to the present invention may emit at least some of the argon ions along the outer sidewall of the second extraction lens EL2. In other words, the front surface EL2*f* of the second extraction lens EL2 and the front surface EL1*f* of the first extraction lens EL1 may be spaced apart from each other, and thus, an amount of argon ions traveling into the internal space of the second extraction lens EL2 may be reduced. Therefore, the resolution and measurement accuracy of the mass spectrometer according to the present invention may be improved.

Figure 4:
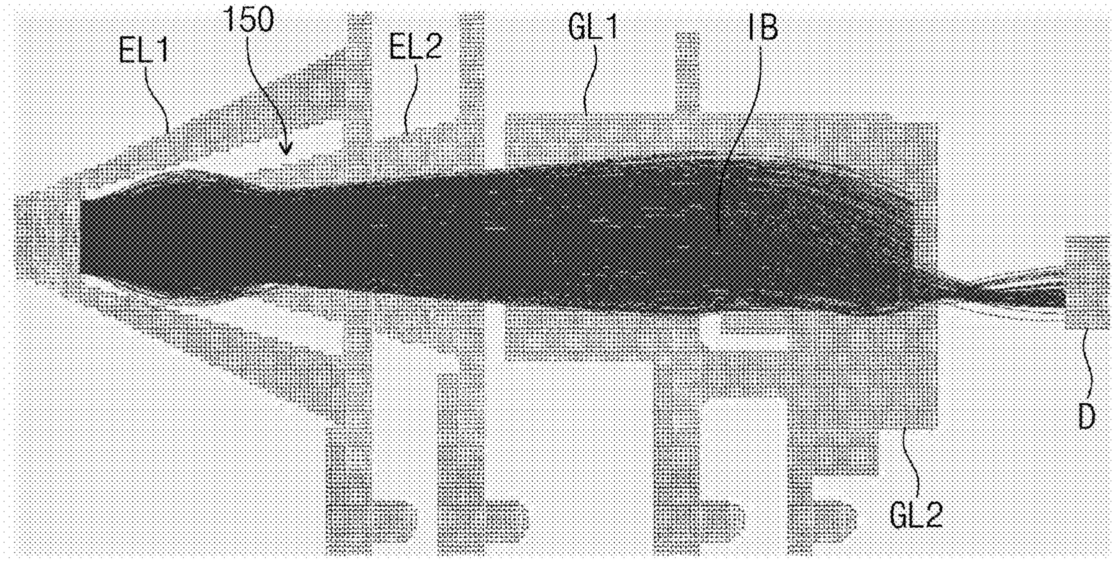
FIG. 4 is simulation pictures for explaining a path and transmission efficiency of ion beam within an ion lens part of a mass spectrometer according to a comparative example.
Figure 5:
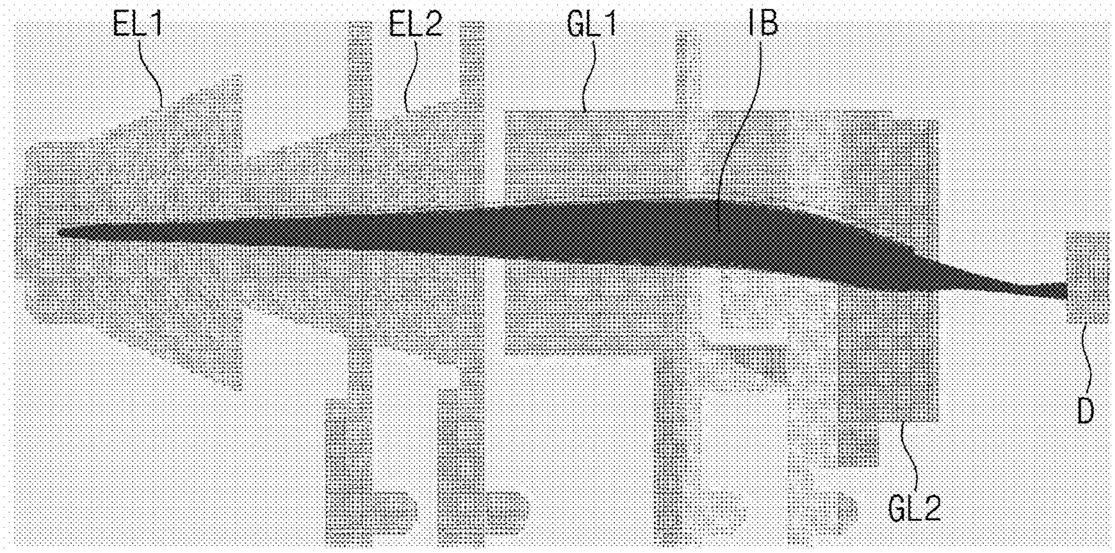
FIG. 5 is simulation pictures for explaining a path and transmission efficiency of ion beam within the ion lens part of the mass spectrometer according to embodiments of the present invention.

FIG. 4 is simulation pictures for explaining a path and transmission efficiency of the ion beam within an ion lens part of a mass spectrometer according to a comparative example. FIG. 5 is simulation pictures for explaining a path and transmission efficiency of the ion beam within the ion lens part of the mass spectrometer according to embodiments of the present invention.

More particularly, FIG. 4 is a simulation diagram illustrating a path and transmittance efficiency of ions in the mass spectrometer (i.e., the mass spectrometer according to the comparative example) including the first extraction lens EL1 having the side opening 150, and FIG. 5 is a diagram for explaining a path and transmittance efficiency of ions in the mass spectrometer according to the present invention. Here, current due to a space charge effect may be about 160 μA, and ion beam IB containing matrix components and ions to be analyzed was set to have a mass range of about 40 amu (atomic mass unit) to about 210 amu.

In FIGS. 4 and 5, it is illustrated and explained that a detector D is disposed at a rear end for the purpose of measuring transmittance efficiency of ions passing through the ion lenses EL1, EL2, GL1, and GL2, but the mass spectrometer according to the present invention is not limited thereto, and the reaction part 50 (see FIG. 1) and the mass separation part 60 (see FIG. 1) may be provided between the ion lenses EL1, EL2, GL1, and GL2 and the detector D.

Referring to FIGS. 4 and 5, the transmittance efficiency of the ion beam IB in the mass spectrometer according to the comparative example may be about 7.2%, and the transmittance efficiency of the ion beam IB in the mass spectrometer according to the present invention may be about 49.8%. That is, the transmittance efficiency of the ion beam IB in the present invention may be about 6 times higher than that of the comparative example. The mass spectrometer according to the present invention may improve resolution and measurement accuracy by reducing the loss of the ions to be analyzed.

Although the embodiment of the present invention is described with reference to the accompanying drawings, those with ordinary skill in the technical field of the present invention pertains will be understood that the present invention can be carried out in other specific forms without changing the technical idea or essential features. Therefore, the above-disclosed embodiments are to be considered illustrative and not restrictive.

INDUSTRIAL APPLICABILITY

The present disclosure relates to the mass spectrometer. More specifically, it may be used in the mass spectrometer including the ion lenses, which is used at the environmental sites.

The invention claimed is:

1. A mass spectrometer comprising:

a sample introduction part;

an ionization part connected to the sample introduction part and configured to ionize the sample introduced from the sample introduction part;

an ion lens part comprising an extraction lens adjacent to the ionization part and a guiding lens configured to guide ion beam extracted from the extraction lens;

an interface part between the ionization part and the ion lens part; and a detection part configured to detect ion beam, wherein the extraction lens comprises a first extraction lens adjacent to the interface part and a second extraction lens between the first extraction lens and the guiding lens, each of the first and second extraction lenses has a hollow cone shape, the first extraction lens comprises a protrusion protruding from an outer sidewall thereof to the interface part, and an internal space of the second extraction lens comprises a first space having a pillar shape and a second space having a cone shape and extending from the first space.

2. The mass spectrometer of claim 1, wherein the first extraction lens is configured so that a voltage of 0 V is applied thereto.

3. The mass spectrometer of claim 1, wherein the interface part comprises a skimmer cone, and the skimmer cone comprises a first portion having a hollow cone shape and a second portion connected to the first portion and having a hollow pillar shape.

4. The mass spectrometer of claim 3, wherein a rear surface of the first portion of the skimmer cone coincides with a front surface of the first extraction lens.

5. The mass spectrometer of claim 3, wherein a rear surface of the first portion of the skimmer cone is spaced apart from a front surface of the first extraction lens, and a spaced distance between the rear surface of the first portion of the skimmer cone and the front surface of the first extraction lens is 0.5 mm or less.

6. The mass spectrometer of claim 3, wherein the first extraction lens is in physical contact with the first portion of the skimmer cone.

7. The mass spectrometer of claim 3, wherein an inner sidewall of the skimmer cone comprises at least one or more stepped portions on the inner sidewall of the skimmer cone.

8. The mass spectrometer of claim 7, wherein an internal space of the skimmer cone comprises a first space, a second space, and a third space in the first portion and a fourth space in the second portion, wherein the first space is a cone-shaped space, each of the second to fourth spaces is a pillar-shaped space, a width of a rear surface of the first space is substantially the same as a width of the second space, the width of the second space is less than a width of the third space, and the width of the third space is less than a width of the fourth space.

9. The mass spectrometer of claim 8, wherein at least a portion of the first extraction lens is provided in the fourth space.

10. The mass spectrometer of claim 9, wherein at least a portion of the first extraction lens is provided in the third space.

11. The mass spectrometer of claim 1, wherein at least a portion of the second extraction lens overlaps the first extraction lens, and a front surface of the second extraction lens is disposed between a front surface of the extraction lens and a rear surface of the first extraction lens.

12. The mass spectrometer of claim 11, wherein a spaced distance between the front surface of the second extraction lens and the front surface of the first extraction lens is 4 mm to 10 mm.

13. The mass spectrometer of claim 1, wherein the rear surface of the first extraction lens is disposed inside the interface part.

14. The mass spectrometer of claim 1, wherein the sample introduction part comprises:

a nebulizer configured to change a liquid sample into an aerosol state; and a spray chamber connected to the nebulizer and configured to control a flow of aerosols so that only relatively small-sized aerosols move to the ionization part through a temperature control.

15. The mass spectrometer of claim 14, wherein the ionization part comprises:

a first tube connected to the spray chamber of the sample introduction part and disposed at the innermost side;

a third tube having an end facing the ion lens part and disposed at the outermost side;

a second tube disposed between the first tube and the third tube; and an induction coil having a spiral shape that surrounds the outside of the third tube.

* * * * *